United States Patent [19]

Ostreicher

[11] 4,007,114
[45] Feb. 8, 1977

[54] FIBROUS FILTER MEDIUM AND PROCESS

[75] Inventor: Eugene A. Ostreicher, Farmington, Conn.

[73] Assignee: AMF Incorporated, White Plains, N.Y.

[22] Filed: July 22, 1975

[21] Appl. No.: 597,931

Related U.S. Application Data

[63] Continuation-in-part of Ser. No. 358,822, May 9, 1973, abandoned.

[52] U.S. Cl. .................. 210/23 R; 210/504; 210/505; 210/509
[51] Int. Cl.$^2$ .................................. B01D 13/00
[58] Field of Search .......... 210/503, 504, 505, 506, 210/507, 508, 509, 23 R; 428/503, 502, 363, 407, 288

[56] References Cited

UNITED STATES PATENTS

3,158,532  11/1964  Pall et al. ............... 210/504 X
3,238,056  3/1966   Pall et al. ............... 210/506 X Primary Examiner—Frank A. Spear, Jr.
Attorney, Agent, or Firm—George W. Price; Charles J. Worth

[57] ABSTRACT

Improved filter media comprised of negatively charged high surface area fibrous filter material the surface of which is modified by treatment with a melamine-formaldehyde cationic colloid, processes for the production thereof, and use in liquid filtration to remove submicron contaminants including negatively charged particles. Glass microfiber treated with Parez 607 colloid is preferred.

3 Claims, 7 Drawing Figures

FIBROUS FILTER MEDIUM AND PROCESS

This application is a continuation-in-part of copending application Ser. No. 358,822, filed May 9, 1973, now abandoned.

This invention relates to a new process for treatment of negatively charged high surface area fibrous filter material to improve the filtration efficiency for small particles, especially submicron particles and the improved filter media obtained thereby.

The filtration of fine particle size contaminants from liquids has been accomplished by the use of various porous filter media through which the contaminated liquid is passed. To function as a filter, the media must allow the fluid, commonly water, through while holding back the particulate contaminant. This holding back of the particulate is accomplished by virtue of the operation, within the porous media of one or both of two distinctly different filtration mechanisms, namely (1) mechanical straining and (2) electrokinetic particle capture. In mechanical straining, a particle is removed from the fluid stream by physical entrapment when it attempts to pass through a pore smaller than itself. In the case of the electrokinetic capture mechanism, the particle collides with a surface within the porous material and is retained on the surface by the attractive short range van der Waal's type forces.

In those fibrous filter media that depend upon mechanical straining to hold back particulate contaminants, it is necessary that the pore size of the filter medium be smaller than the particle size of the contaminants that are to be removed from the fluid. If it is desired to remove suspended solids of a fine particle size with a fibrous filter medium that functions by mechanical straining, the sheet formed by the filter material need have correspondingly small pores. Such a filter medium normally exhibits low flow rates and a tendency to clog rapidly.

In those filter media that function by virtue of the electrokinetic particle capture mechanism it is unnecessary that the filter medium have such a small pore size. The ability to achieve the required removal of suspended particulate contaminants with a filter medium of significantly larger pore size is attractive inasmuch as it allows higher flow rates and reduces the tendency of the filter medium to clog rapidly. The ability of a filter medium to hold back suspended solids of a fine particle size by electrokinetic particle capture depends to a significant extent on the surface properties, particularly the surface charge, of both the filter material of which the medium is composed and the suspended solids. It is not feasible to measure the charge on a surface directly. Instead, various indirect techniques, such as electrophoretic mobility, streaming potential, etc., are used to determine the zeta potential, i.e., the electric potential excess of the surface, and the surrounding fluid to the hydrodynamic shear plane, over the bulk potential of the fluid. Inasmuch as surface charge can only be quantified in terms of the zeta potential, all further characterizations of surface charge will be in terms of the zeta potential. While the zeta potential exhibited by a surface normally depends upon the composition of the filter material, it may be modified by other materials that become absorbed or chemically bonded to the surface of the filter material.

The effect of zeta potential on the electrokinetic capture mechanism is associated with the ability of the suspended solid contaminant particle to come into contact with a surface within the porous medium. In order for such contact to occur, it is necessary that either the contaminant particle or filter material surface posses a zero zeta potential, or that the surface have an opposite zeta potential from that of the contaminant particle. If the contaminant particle and the filter material surface have like zeta potentials, there will be a repulsive effect that interferes with the particle's ability to come into contact with the surface. Once in contact with the surface, the particle will be retained by short range van der Waal's forces, which are always attractive. In those situations where electrokinetic capture does occur, the filtration performance is enhanced by the availability of a high filter material surface area within the filter medium. The reason for this is that, as the oppositely charged particles deposit on the surface of the filter material, the deposited particles tend to modify the zeta potential of the surface and, eventually, the surface will develop a like zeta potential, effectively inhibiting any additional deposition. The availability of a high opposite charge and a high surface area thus extend the functional life of the filter medium. The particle size, and the geometry, porosity and depth of the filter medium also affect the life and filtration efficiency.

Asbestos fiber has long been used for filtration of fine or very fine solids and the use thereof has been well-documented in the literature, e.g. Proceedings of the Filtration Society, Filter Sheets and Sheet Filtration by Geoffrey Osgood, published *in Filtration and Separation*, July/August 1967, pp. 327–337 (A paper originally presented at the Filtration Society Meeting, London, Apr. 4, 1967), also, Proceedings of the Filtration Society, Asbestos Filter Sheets by D. McLean Wyllie, published in *Filtration and Separation*, March/April 1973, pp. 175–178 (A paper originally presented at the second joint AICHE-Filtration Society Symposium, Minneapolis, Minnesota, Aug. 27–30, 1972). The high filtration efficiency of asbestos fibers is attributable not only to mechanical straining effects but also to the fineness and high surface areas of the fibers, which, in conjunction with the positive zeta potential exhibited by asbestos, result in a highly efficient electrokinetic capture of negatively charged contaminant particles. Attempts to duplicate the filtration efficiency of asbestos in other materials by duplicating the physical state (size, shape, etc.) of asbestos fibers have, up to the present, not been effective. For example, duplication of asbestos filter material with glass fibers, or diatomaceous earth, has not provided filtration efficiency even approaching that of asbestos. No other filter material has a positive zeta potential of the same order as asbestos fiber.

In the past, improvement in the filtration efficiency of filter material has taken several approaches. Improved filtration performances have been realized by chemical treatment to alter the surface properties and, thereby, the size of the suspended solids (i.e., flocculation) to improve the straining effects. (See U.S. Pat. Nos. 3,131,144; 3,227,650; 3,235,492; 3,297,106; 3,542,674; 3,562,154 or 3,668,184). Improved filter performance is also realized by altering the surface properties of the filter material. (See U.S. Pat. Nos. 2,040,818; 2,036,258; 2,797,163 or 2,971,907).

Development of the art has favored the application of specific highly charged polyelectrolyte materials. Thus, U.S. Pat. Nos. 3,352,424 and 3,242,073 describe the coating of filter materials with organic polyelectrolytes, e.g. polyalkylenimines. Baumann et al, in "polyelectrolyte Coatings for Filter Media". Proceedings of the Filtration Society: Filtration and Separation. (Nov./Dec. 1970) pp. 652–690 describe additional research.

These polyelectrolyte materials are unfortunately of relatively sophisticated structure, high molecular weight, high charge density and concomitantly high manufacturing cost. Accordingly, advantage is seen in the provisions of a cheaper but efficacious substitute.

An improvement is liquid filtration as for food and beverage compositions, pharmaceuticals, or in water purification and the like, especially for submicron negatively charged contaminants has now been achieved by modifying the surface of negatively charged high surface area filter materials with a cationic melamine-formaldehyde colloid. Surprisingly, the improvment is afforded by treatment with the colloid form of a melamine-formaldehyde resin despite its low molecular weight and low specific charge. The resin is applied, as hereinafter described more particularly, to the fibrous filter material, and the fibrous filter medium in the form of a filter sheet is subsequently formed dynamically in a manner well-known to the art, as by vacuum techniques.

Melamine-formaldehyde resins including the cationic colloid are well-known and these resins have commonly been used in the paper industry to impart water resistance, i.e., wet-strength as shown in U.S. Pat. No. 2,563,897. Melamine-formaldehyde colloids are formed solutions of a melamine monomer acid addition salt by condensation of about 20 units of the monomer with elimination of water to form cationic colloid particles. During formation, some of the acid of the monomer addition salt is liberated and the progress of the condensation can be followed by measuring the drop in pH. The chemistry of melamine-formaldehyde colloids is described in numerous literature articles, e.g. Chapter 2, Melamine Formaldehyde, C. S. Maxwell, *Wet Strength in Paper and Paper Board*, Tappi Monograph Series No. 29, 1965 and *Amino Resins*, John J. Blair, pp. 19–25, Reinhold Publishing Corp., New York, 1959, and the specific colloids of the invention may be prepared in accordance with these disclosures or U.S. Pat. Nos. 2,345,543; 2,559,220 or related U.S. Pat. Nos. 2,485,079—80. The compounds generally designated melamine—formaldehyde embrace the methylol melamine monomers in which there are from 1 to 6 methylol substituents, the most commonly employed being the di- or trimethylol compounds.

High surface area fibrous filter materials are well-known in the art. These fiber materials are characterized by the small diameter of the fiber in the micron or submicronic range, and are generally referred to as micro-fibers for this reason. For example, glass fibers are of the order of a fraction of a micron up to several microns.

With the exception of asbestos, the high surface area fibrous filter materials tend to exhibit a negative zeta potential. For example, glass fibers in contact with a polar liquid exhibit a negative zeta potential. In water (pH = 7.0), the zeta potential of glass microfibers has been determined to be −41 mv. Consequently, when such material as glass fiber is used for filtration of fine particle suspended solids, there is no particle removal by electrokinetic capture because most suspended solids are also negatively charged. Thus, the only filtering effect attainable with the negatively charged filter materials is the so-called straining effect described hereinbefore. Thus, the efficiency of such filter materials with fine particle suspended solids is limited and never approaches the filtration efficiency of positively charged filter materials known to be useful for this purpose, e.g. asbestos fibers.

The present invention is concerned with overcoming the deficiencies of the negatively charged, high surface area fibrous filter materials in an economical manner to permit use of these materials in filter media for filtration of finely-divided suspended solids. Essentially, the present invention utilizing a melamine-formaldehyde colloid provides a process which at least reduces the negative charge on filter materials of the type described and thus enhances electrokinetic capture of fine particle suspended solids. The colloid particles appear to adhere to the surface of the filter material producing highly positively charged sites on the surface so that filter media composed of fibrous filter material so treated are capable of removing, by electrokinetic capture fine particles suspended solids which, without such modification, would not be removed by the filter medium. The results obtained with a modified glass-cellulose filter medium in filtration efficiency determinations indicate that modified glass micro-fibers produce the same order of efficiency as asbestos fibers. In view of the present knowledge of filtration mechanisms and the nature of asbestos' function, these comparative data suggest that the modified glass fibers have a positive charge similar in nature to that of asbestos and that the enhanced filtration efficiency of the modified glass fibers is attributable to this charge modification. It appears then that the deposited melamine-formaldehyde colloid particles surprisingly must retain their cationic properties after adsorption and drying if in fact the mechanism of filtration occurs as theoretically postulated. While not wishing to be bound by any theoretical explanation of the phenomenon observed, the applicant offers the foregoing as an explanation of the results observed, which are surprising and most unexpected since the melamine-formaldehyde colloids would not be expected to retain their cationic properties after their deposition onto the fiber surface and subsequent drying and this phenomenon has not been recognized in the prior art.

The process of this invention is accomplished by merely contacting the melamine-formaldehyde colloid with the selected filter material, conveniently in a suitable medium. The colloid dispersions are normally and conveniently prepared in aqueous media which is also suitable for the modification of the filter material. In a simple form of the present process, the filter material is added to an aqueous dispersion of the colloid and mixed by any convenient means to assure commingling of the respective solids. In a very short period of time, the colloid particles deposit on the filter material, usually within several minutes, and the mixture can be further processed as desired to separate and dry the modified filter material. Alternative mixing sequences, and alternative treatment techniques such as spraying or blending are equally suitable as means for treating the filter material with the melamine-formaldehyde colloid. If desired, the filter material, e.g., glass microfibers, can be further treated while in the aqueous mixture or in the final dried condition by addition of further materials, e.g. cellulose fibers which can serve as a self-bonding matrix for the glass micro-fibers to form a sheet type filter medium.

The process conditions are not critical as long as the colloid is permitted to contact the filter material. The amounts of the dispersion medium, e.g. water, do not seem to be critical. Even when large volumes of water are used, i.e., a dilute medium with only minimum amounts of colloid, (e.g. about 1-2% by weight of liquid) modification of the filter media occurs. The dispersing medium employed should be polar to permit the deposition to proceed efficiently. The time required for modification does not appear critical since deposition reaches a high percentage of final equilibrium values with about 0.5 to about 6 minutes being adequate for most purposes. Of course, longer periods of exposure, e.g. up to several hours, can be used to assure relatively complete deposition. A period of about 15 minutes up to 2 hours is typical.

The amount of colloid added to the filter material is not critical but is merely a matter of functionality. For example, a high surface area filter material may require more resin for optimum filtration than one of lower surface area. Nevertheless as the resin is adsorbed onto the surface area of the material, the filtration efficiency is enhanced, so that even small amounts of the colloid are effective.

The melamine-formaldehyde used to produce the colloid in the present process can readily be obtained from commercial sources. Most commonly, a di- or trimethylol-melamine is used and is generally preferred. The monomethylol melamines do not appear to be as effective while the tetra-, penta- and hexamethylolmelamines do not appear to provide any advantage over the di or trimethylol derivative and are most expensive. If desired, these melamine derivatives can be prepared as described in the scientific literature.

The filter material is, of course, readily attainable from commercial sources and may be prepared by methods described in the literature. Thus, glass microfibers are obtainable from Johns-Manville, Celite Division, in a variety of fiber diameters.

For the purpose of the present invention, any high surface area fibrous filter material which exhibits a negative zeta potential can be modified by the present process to improve the filtration performance. In the present disclosure and the appended claims, the expression 'high surface area' is intended to mean fibers of micron or submicronic diameters, and the expression 'negative filter material' means a filter material which exhibits a negative zeta potential. In every instance, reference to diameter is intended to refer to average diameter as is common practice in referring to fiber dimensions.

DESCRIPTION OF PREFERRED EMBODIMENTS

The preferred filter material is glass micro-fiber of about one micron or less diameter. The most preferred are glass fibers of from about 0.05 to about 0.75 micron in diameter. Other suitable filter materials include synethetic polymer fibers or fibrils of about one micron or less in diameter, e.g. polyacrylonitrile, polypropylene or any synthetic polymer fiber or fibrillated fiber of the diameter of the preferred glass fibers and of high wet modulus.

Low molecular weight (1000-4000) melamine-formaldehyde resin colloids are preferred since they are readily prepared or available and provide stable colloids with substantial shelf-life in aqueous suspension. This invention contemplates the use of other substituted melamine-formaldehyde resins which form cationic colloids similar to those produced with di- or trimethylolmelamine, but the di- and trimethylolmelamines are preferred because they are commercially available and economical, and readily form colloids. Colloids prepared from di- and trimethylolmelamines are preferred. Higher methylol content does not seem to be any more efficient than the trimethylolmelamine resins and, because they are more costly, the tetra to hexamethyol-melamines are less attractive for use.

The liquid medium for the present process is a polar medium, advantageously an aqueous medium as mentioned hereinbefore. Water is the simplest, most adequate and most economical and therefore is preferred.

In the modification process, the colloid and the filter material are merely added to water and then subjected to mixing to provide intimate contact between the respective solids. For most purposes, it is sufficient to stir the mixture for short periods of time to permit mixing of the respective solids. Usually, the colloid is added to the mixture in the form of an aqueous dispersion of from about 3% to about 50% by weight, although from about 5% to about 20% by weight is preferred. Typically 5-7% solids is used with Parez 607 colloid. The weight of colloid based upon filter material in the dispersion ranges from the minimum to effect charge modification up to about 50%, preferably about 10%, and up to about 40%, with optimum results seen for selected materials in the 5 to 25% range. As hereinbefore mentioned, the amount of water used as the medium is not critical but sufficient water should be present to permit the necessary contact between the colloid and filter material.

After mixing, the surface-modified filter material can be separated from the reaction mixture by any method which is conventional, e.g. with the preferred glass fibers, after surface modification, the fibers can be separated from the reaction mixture by filtration. Preferably, since the fibers are primarily intended for the preparation of filter sheet, a matrix of self-bonding fibers is used. The self-bonding fibers can be added directly to the glass dispersion and, after further mixing, the entire mass of fibers can then be processed into filter sheet by methods well-known to the art. The preferred self-bonding fiber for the matrix is cellulose, which is commonly used in filter sheet production. The amount of cellulose fibers used as matrix may range up to about 90% by weight of the filter sheet.

The filter media of the invention may of course be used in combination with other available filtration systems, forming only part, for example, of a series of discs in cartridge filtration but as seen from the Examples, are efficient alone to provide excellent filtration performance.

The filtration efficiency realized with the surface-modifed filter materials of this invention are illustrated in the enclosed FIGS. 1-6.

FIGS. 1-4 compare the filter efficency of surface modified filter with untreated filter and clearly illustrate the unexpectedly higher efficiency of surface-modified filter in removal of suspended solids of less than about 0.7 micron in diameter. Where the curves for each filter meet, the filtration is by straining, i.e., is a function of pore size of the filter. FIGS. 5 and 6 illustrate an experimental determination of the more efficient filter by variation of the filter medium composition. Such determinations can be used to determine optimum filter systems containing the surface charge modified filter material of this invention. Thus, with a minimum of experimentation and testing, it is possible to select the best filter system for any given mixture of solids suspended in liquid by utilizing the test procedures described in the examples to which FIGS. 1–6 refer.

The following examples further illustrate the invention:

EXAMPLE I

General Procedure
1. Colloid Dispersion (for 10 gallons):
  A. Materials
  Water, 70 ± 20° F — 8.8 gallons
  Muriatic Acid, 30° Be — 0.4 gallons
  "Parez" Resin 607 — 10.0 Pounds Add resin to acid-water mixture using agitation until complete solution is obtained (approx. 30 minutes as indicated by colorless, water-clear solution). An aging period of at least 3 hours is required to allow formation of colloid as indicated by formation of distinct bluish haze. For better stability in storage, the colloid dispersion is diluted to 6 percent solids and used in the subsequent step 3.

B. Improved Performance for Parez 607 systems may be secured by utilizing reagent grade hydrochloric acid, at an acid ratio (moles HCl/moles resin) of 0.60 to 0.65.

Preparation A was employed for Example I, and preparation B for the remaining Examples. 2. To 10 gallons of water is added "A" grams of cellulose kraft fiber and the slurry is defibered in a mixer for 1 ½ hours. 3. To 4 gallons of water is added "B" grams of glass type "C". The fibers are dispersed by manual stirring. "D" grams of 6 percent resin colloid dispersion is added to provide a specific filter material/colloid weight ratio in the dispersion. The mixture is stirred and then let stand for 1 ½ hours. 4. The glass fiber slurry is added to cellulose fiber slurry and defibered in a mixture for additional 15 minutes. 5. Using 27 × 27 screen tray, the mixture is vacuum felted (15 Hg) to obtain one 3/16 thick sheet. 6. The sheet is removed from the tray and placed in oven for 25 minutes at 350° F.

Using this General Procedure, filter sheets are prepared as described in Table 1.

Table 1

| Example | Formulation (1) | A | B | C(2) | D |
|---|---|---|---|---|---|
| 1a | 75-25-0 | 300 | 100 | AAA | 0 |
| 1b | 75-25-10 | 300 | 100 | AAA | 167 |
| 1c | 75-25-20 | 300 | 100 | AAA | 333 |
| 1d | 75-25-40 | 300 | 100 | AAA | 666 |
| 1e | 50-50-0 | 200 | 200 | AAA | 0 |
| 1f | 50-50-10 | 200 | 200 | AAA | 333 |
| 1g | 50-50-20 | 200 | 200 | AAA | 666 |
| 1h | 50-50-40 | 200 | 200 | AAA | 1332 |
| 1i | 75-25-0 | 300 | 100 | AAAA | 0 |
| 1j | 75-25-10 | 300 | 100 | AAAA | 167 |
| 1k | 75-25-20 | 300 | 100 | AAAA | 333 |
| 1l | 75-25-40 | 300 | 100 | AAAA | 666 |
| 1m | 50-50-0 | 200 | 200 | AAAA | 0 |
| 1n | 50-50-10 | 200 | 200 | AAAA | 333 |
| 1o | 50-50-20 | 200 | 200 | AAAA | 666 |
| 1p | 50-50-40 | 200 | 200 | AAAA | 1332 |

1. First two numbers give cellulose fiber and glass fiber weight percents, and the third number gives weight percent colloid based upon glass weight in the dispersion.

2. Glass type AAA is glass micro-fiber of from 0.5 –0.749 micron diameter (Code 106, Johns-Manville), while type AAAA (Code 104, Johns-Manville) is from 0.2 – 0.499 micron diameter. Each measurement is the average minimum and maximum measured by the Williams Freeness Test.

TEST PROCEDURES

1. Test Contaminant

Test contaminant consisted of monodisperse polystyrene latices (Dow Diagnostics) of the following sizes:
0.109 microns
0.234 microns
0.357 microns
0.481 microns
0.794 microns The particular latex used in a test is mixed with double glass distilled water to produce a dispersion with a turbidity of 100 FTU (Formalin Turbidity Units, also referred to as the equivalent NTU of Nephalometric Turbidity Units) as measured on a Hach Model 2100A Turbidimeter. The pH of the test dispersion is 6.5 – 7.0.

2. Test Technique (Efficiency vs. Particle size) FIGS. 1–4

The sheet material is cut into 57 mm dia. discs. The discs are placed in a Millipore 47 mm vacuum filter holder and 100 ml of the prepared contaminant dispersion filtered through the disc using a 23 in. Hg vacuum. The turbidity of the filter effluent is measured using the Hach Turbidimeter.

Efficiency = Turbidity In - Turbidity Out/Turbidity In

3. Test Technique (Efficiency vs. Fluid Volume) FIGS. 5 and 6

These tests are performed using a 100 FTU dispersion of the 0.109 micron latex. The test technique is identical to that given in 2, except that the 100 ml filtrations are repeated on a single disc of media until the efficiency showed significant deterioration.

Test Results are indicated in attached FIGS. 1–6.

Figure 1:
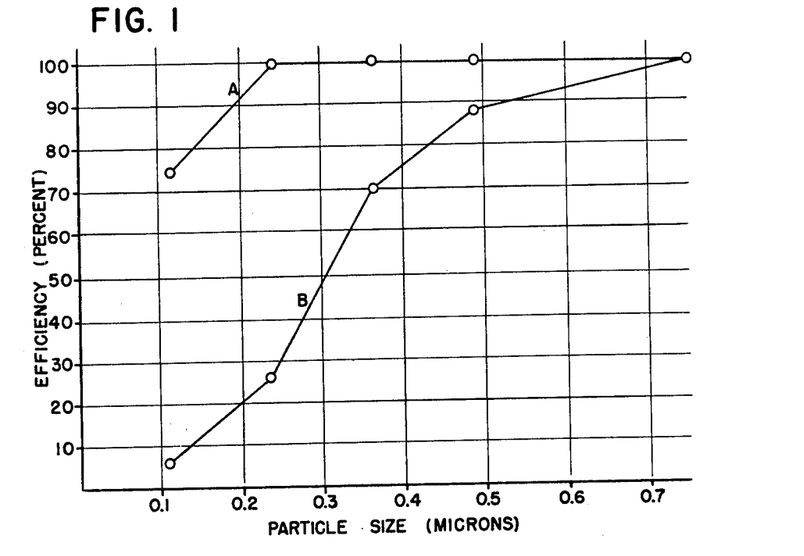
FIGS. 1-4 are plots of percentage efficiency of filtration versus the particle size of suspended solids being filtered.

FIG. 1 — Particle Size vs. Efficiency for Sample 1c and Sample 1a.

Figure 2:
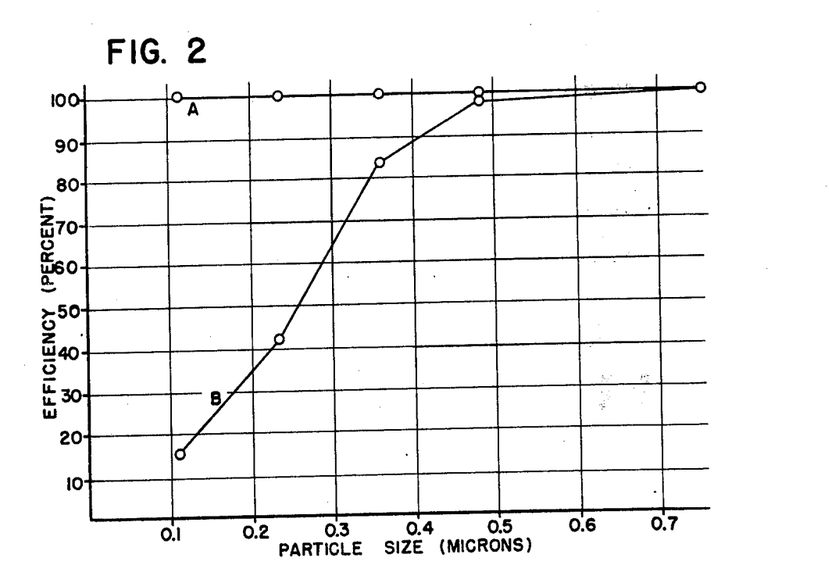

FIG. 2 — Particle Size vs. Efficiency for Sample 1g and Sample 1e.

Figure 3:
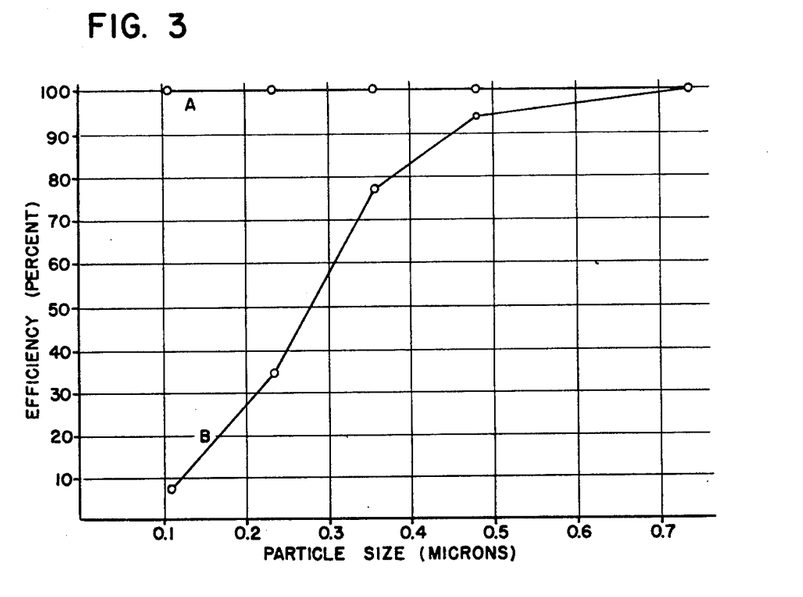

FIG. 3 — Particle Size vs. Efficiency for Sample 1k and Sample 1i.

Figure 4:
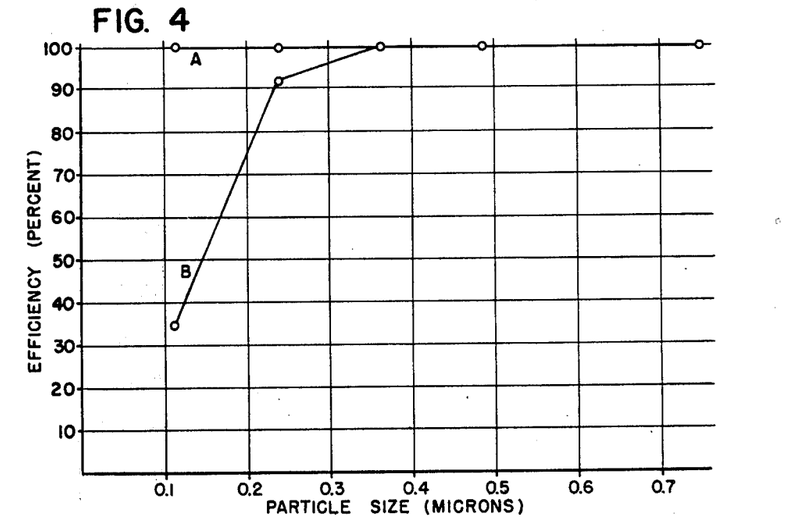

FIG. 4 — Particle Size vs. Efficiency for Sample 1o and Sample 1m.

Figure 5:
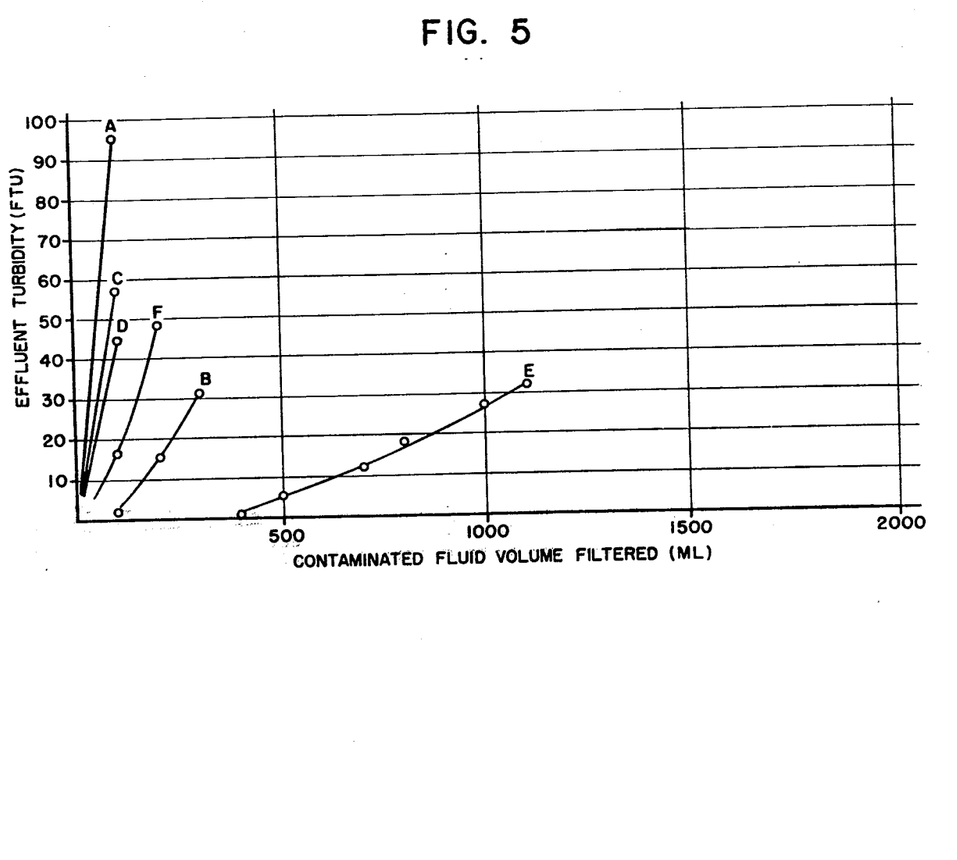
FIGS. 5 and 6 are plots of effluent turbidity (as a measure of filtration efficiency) versus contaminated fluid volumes filtered (in ml.).

FIG. 5 — Effluent Turbidity vs. Contaminated Fluid Volume Filtered for AAA glass formulations (Samples 1b, 1c, 1d, 1f, 1g, 1h which correspond respectively to lines A, B, C, D, E, F).

Figure 6:
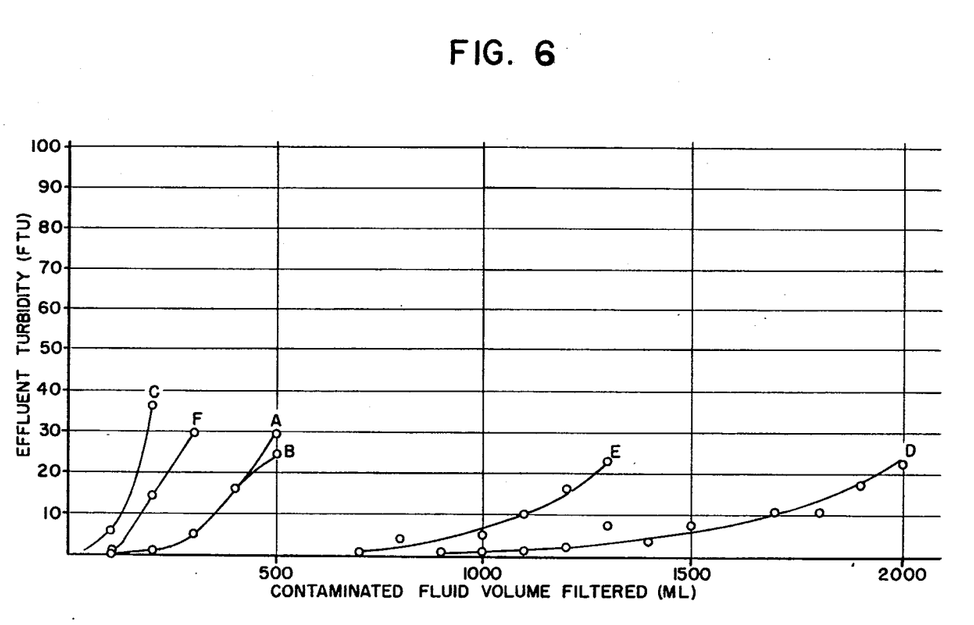
Figure 7:
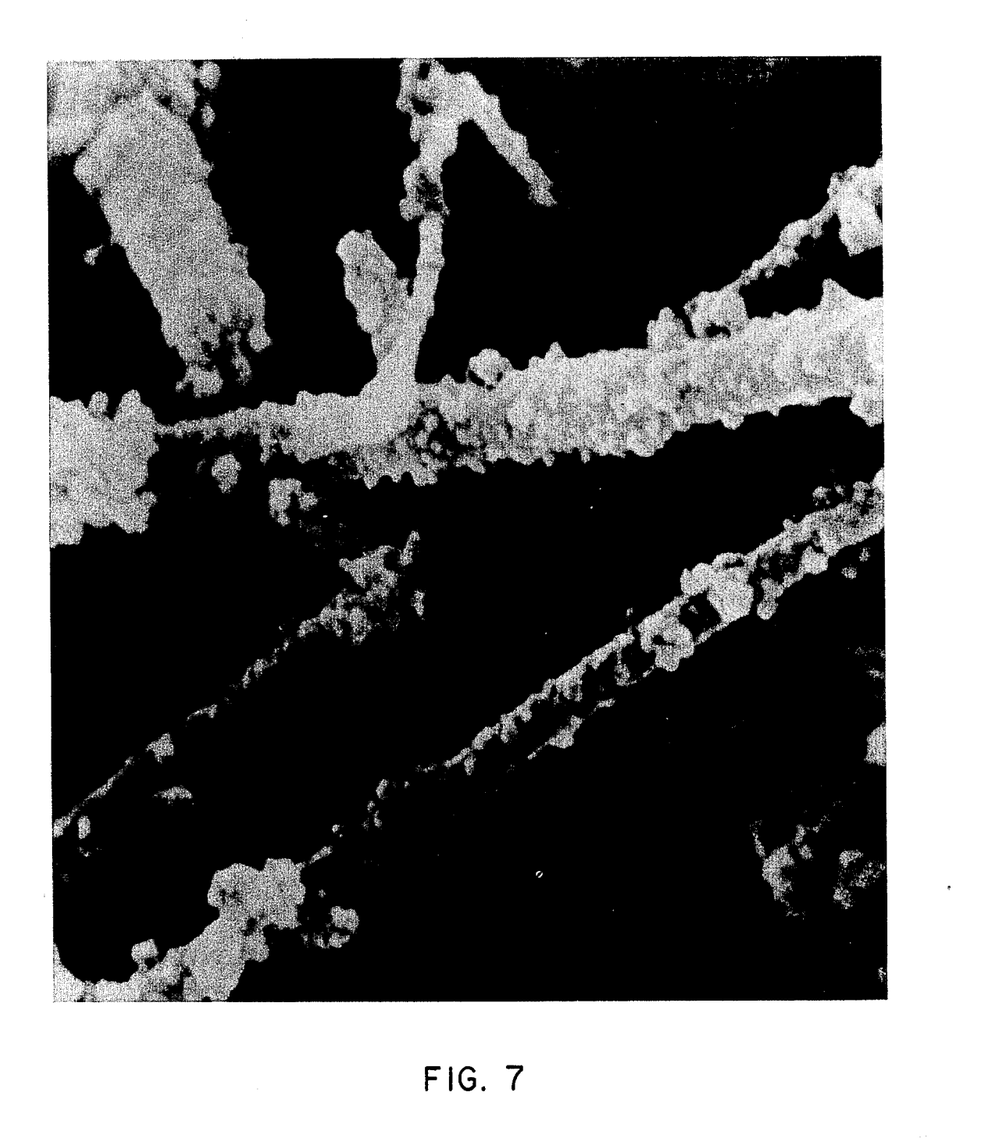
FIG. 7 is a photographic enlargement (40000x) by scanning electron photomicrography of the surface of glass filter media treated in accordance with the invention, shown after use to illustrate the submicronic negatively charged particles adsorbed on the media fibers.

FIG. 6 — Effluent Turbidity vs. Contaminated Fluid Volume Filtered for AAAA glass formulations (Samples 1j, 1k, 1l, 1n, 1o, 1p which correspond respectively to lines A, B, C, D, E, F).

In each of FIGS. 1–4, the curves labelled "A" represent the treated Samples and curves labelled "B", the untreated Samples. Referring to FIG. 6, Curved D (Sample 1n) indicates that this medium shows better filtration efficiency with increased volume of liquid filtered than the other Samples tested.

4. Membrane Protection

In this test, contaminated fluid is pumped under standard conditions through test filter media and a membrane in series at a constant flow rate, and differential pressure with time recorded. The time or total volume of flow passed at a defined pressure increase is a measure of the life of the prefilter, and interrelates satisfactorily with performance in use. Typically, a 47 mm. 0.22 micron membrane is employed at a flow rate of 225 ml. min. Test contaminant may be the Dow Diagnostics monodisperse latex referred to above, but a poly-disperse contaminant is often preferable as representative of actual use conditions, and for this purpose Hyplar (produced by Grumbacher) an acrylic latex produced by emulsion polymerization and comprising colloidal polymer particles ranging from 0.05 to 1.0 micron is suitable. Contaminant level may range from 10 to 50 FTU (Hach Turbidimeter, Model 2100A. The test is continued until the differential pressure across either the membrane or the test filter pad excedes 5 pounds (psid). Membrane protection times of less than a few minutes indicates no practically useful effect.

In a representative such test, a series of glass microfiber filter media were treated with melamine-formaldehyde colloid (glass/colloid 10:1 weight basis) in the manner of Example I, utilizing varying glass microfiber diameter and cellulose level in the sheets, with the results tabulated below. Hyplar contaminated water (50 FTU) ml. min. employed, at a flow rate of 225 ml.min. Values reported are average of extended replicate testing. Extraction tests of such samples indicate that 25 to 50 percent of the melamine-formaldehyde colloid is retained on the glass fiber in the filter sheet.

Table 2

| Glass, % | Cellulose, % | Membrane Protection Time, Minutes |
|---|---|---|
| 7.5 (1) | 92.5 | 4 |
| 15 (1) | 85 | 6 |
| 25 (1) | 75 | 14 |
| 50 (1) | 50 | 28 |
| 75 (1) | 25 | 38 |
| 75 (2) | 25 | 57 |

(1) Code 104, Johns-Manville, 0.2 – 0.499 micron avg. diameter
(2) Code 102, Johns-Manville, 0.1 – 0.199 micron avg. diameter

EXAMPLE II

To demonstrate the charge effect of the melamine-formaldehyde colloid on the glass fiber substrate, the zeta potential of treated and untreated glass was determined. Flame blown virgin glass fiber produced from borosilicate glass, type AAAA (Code 104, Johns-Manville) free of finishing agent and having an average fiber diameter of 0.2 to 0.499 microns and a surface area of about 3 $m^2$/gram, as determined by B.E.T. nitrogen adsorption was employed throughout and was treated as indicated with Parez 607 acid colloid in the manner of Example I.

The change in zeta potential for pH adjusted and unadjusted samples with colloid treatment is evident from the following table:

Table 3

| % Parez 607 Colloid | pH | Zeta Potential |
|---|---|---|
| 0 | 6.9 | −30 |
| 1 | 6.5 | +32 |
| 5 | 6.2 | +45 |
| 10 | 5.9 | +51 |
| 20 | 5.0 | +47 |
| 25 | 4.7 | +44 |
| 1 | 4.7, adj. | +48 |
| 5 | " | +52 |
| 10 | " | +54 |
| 20 | " | +47 |
| .25 | 8.2, adj. | +22 |
| 1.0 | " | +40 |
| 5.0 | " | +55 |
| 10.0 | " | +61 |
| 20.0 | " | +43 |

The marked effect of the colloid is seen even at low levels, and optimum charge effect is developed at about a 10% weight level.

EXAMPLE III

To provide a critical comparison evidencing the distinct and selective effect of the colloidal form of melamine-formaldehyde in filtration utilizing surface modified glass fiber sheets, performance in membrane was tested for the filter media of the invention, and a comparable glass fiber structure prepared utilizing Cymel 481, a water soluble, non-colloidal resin of the type used as bonding agents.

Treated test filter media sheets were prepared by contacting a 1% consistency aqueous dispersion comprising high surface area negative filter material being glass microfiber (flame blown virgin glass fiber produced from borosilicate glass) type AAAA free of finishing agent and having an average fiber diameter of 0.2 to 0.499 microns and a surface area of about 3 $m^2$/gram, as determined by B.E.T. nitrogen adsorption with 1. an aqueous dispersion (6% solids) of Parez 607, a cationic colloidal melamine-formaldehyde resin, and
2. an aqueous solution (6% solids) of Cymel 481, a water soluble non-colloidal melamine-formaldehyde resin, in proportion to provide 10 percent by weight of resin based upon glass microfiber, vacuum felting with cellulose fiber into filter media sheet comprising 75 percent by weight of glass and 25 percent by weight of cellulose, draining and drying at 350° F for 25 minutes, all in accordance with the procedure of Example I.

Hyplar polydisperse contaminant was employed in water at a level to provide a Turbidimeter reading of 50 NTU, and the contaminated fluid was passed through the test filter media and a 47 mm. 0.22 micron membrane, at a flow rate of 225 ml/min.

The filter media prepared using the cationic colloidal Parez 607 gave membrane protection time of nearly 50 minutes in the treatment of over 10 liters of contaminated water, whereas the filter media using the water soluble Cymel 481 resin failed to give any protection (sudden buildup of pressure to 25 psid within about 0.3 minutes as measured by differential pressure gauge).

EXAMPLE IV

Glass filter media were prepared in accordance with Example I, utilizing the colloidal form of Cymel 409, a melamine-formaldehyde resin supplied by American Cyanamid. This resin was dissolved in HCl/water at an acid ratio (moles HCl/moles resin) of 0.83 to form a 12% solids solution. Colloid formation was evident from the characteristic blue haze within three hours and the resulting dispersion (pH 2.4, viscosity 1.10 CP) was diluted to 6% solids. The surface modified glass fiber (Code 104, Johns-Manville; 10:1 glass/colloid weight basis) was vacuum felted, with cellulose fiber to form a sheet containing 75% glass, and 25% cellulose, drained and dried in a three stage heat treatment zone (345°, 370°, 280° F. for 27 minutes.) 100 ml of contaminated fluid (water, Dow Diagnostics latex to provide turbidity of 100 NTU) was passed through the filter media, and filtration efficiency measured, with the following results:

|  | Filtration Efficiency, % | | | | |
|---|---|---|---|---|---|
|  | 0.109 micron | 0.234 micron | 0.357 micron | 0.481 micron | 0.794 micron |
| Treated | 14.0 | 94.7 | 99.2 | 99.4 | 99.4 |
| Untreated | 1.0 | 5.0 | 28.0 | 68.0 | 98.5 |

Excellent efficiency is seen in the 0.2 to 0.5 region, with straining effects predominating at larger particle sizes. A similarly treated sample was also tested in membrane protection (Hyplar in water, 50 NTU) and evidenced protection for greater than 53 minutes, whereas a control showed essentially no protection (0.3 minutes).

These results were then compared with the performance of identically treated and prepared glass filter media, wherein the melamine-formaldehyde resin was of the solution, i.e., non-colloidal type. Cymel 409 powder was dissolved in 50/50 ethanol water to form a 6% solids solution which did not evidence colloid formation, and glass fiber (Code 104 Johns-Manville) treated, at a glass/resin weight ratio of 10:1. The following results were obtained:

|  | Filtration Efficiency, % | | | | |
|---|---|---|---|---|---|
|  | 0.109 micron | 0.234 micron | 0.357 micron | 0.481 micron | 0.794 micron |
| Treated | 0 | 10.0 | 50.0 | 85.0 | 98.8 |

|  | Filtration Efficiency, % | | | | |
|---|---|---|---|---|---|
|  | 0.109 micron | 0.234 micron | 0.357 micron | 0.481 micron | 0.794 micron |
| Untreated | 1.0 | 5.0 | 28.0 | 68.0 | 98.5 |

Both samples failed in membrane protection testing (Hyplar, 50 NTU). Membrane failure also occurred with Cymel 481, another water soluble, non-colloidal melamine-formaldehyde resin.

EXAMPLE V

The level of glass and cellulose was varied in the following runs, wherein the filter sheets were prepared as in Example I, using Code 104 glass/colloid (Parez 607) weight ratio 10:1 and a three stage heat treatment zone (345°, 370°, 280° F.) for 27 minutes.

Table 4

|  | Filtration Efficiency, % | | | | | Membrane Protection |
|---|---|---|---|---|---|---|
|  | Monodisperse Latex Diameter | | | | | |
| Glass, % | .109 | .235 | .357 | .481 | .794 | Minutes (hyplar 50 NTU) |
| 50%, Treated | 11.0 | 69.0 | 98.4 | 99.6 | 99.8 | 34 |
| 50%, Untreated | 2.0 | 36.0 | 57.0 | 61.0 | 99.0 | 0.3 |
| 75%, Treated | 22.0 | 98.1 | 99.6 | 99.7 | 99.8 | 42 |
| 75%, Untreated | 1.0 | 5.0 | 28.0 | 68.0 | 98.5 | 0.3 |
| 100%, Treated | 66.0 | 99.0 | 99.4 | 99.6 | 99.8 | 59 |
| 100%, Untreated | 0 | 6.0 | 45.0 | 83.0 | 98.4 | 0.3 |

The foregoing Examples illustrate the remarkable improvement in filtration performance achieved with the surface modification of high surface area filter materials utilizing melamine-formaldehyde colloids. Surprisingly, little effect is seen on normal cellulose fibers as employed in filter papers: the following comparative Example is representative:

EXAMPLE VI

Cellulose (Coho Kraft wood pulp) was slurried with a 6% Parez 607 acid colloid dispersion to provide 10% by weight of colloid relative to the cellulose, and a sheet was formed in conventional manner. (300 gm, 27 × 27 inch sheet)

Performance of treated and untreated sheet, formed in the same manner, was determined in a membrane protection test. A test solution of water contaminated with a polydisperse acrylic latex (Hyplar manufactured by Grumbacher produced by emulsion polymerization and comprising colloid polymer particles ranging from 0.05 to 1.0 microns (50 FTU) was pumped through the test filter media and a membrane (47 mm, 0.22 micron) in series at a flow rate of 225 ml/min, and differential pressure with time recorded.

Neither treated nor untreated filter media provided membrane protection, failure occuring within 1 minute.

Similarly, asbestos-cellulose filter media show no improvement in filtration when treated with colloid, because deposition occurs only on the cellulose fibers (asbestos fibers, being cationic, will not accept the cationic colloid).

EXAMPLE VII

Filter media in accordance with the invention, prepared in a form adapted for use as filter cartridges or elements, i.e., as discs, sheets or cylinders may be employed alone or in combination with untreated filter media to treat pharmaceuticals such as antibiotics, saline solutions, dextrose solutions, vaccines, blood plasma, serums, sterile water or eye washes; beverages, such as cordials, gin, vodka, beer, scotch, whisky, sweet and dry wines, champagne or brandy; cosmetics such as mouthwash, perfume, shampoo, hair tonic, face cream or shaving lotion; food products such as vinegar, vegatable oils, extracts, syrups, fruit juices, make-up water or cooking oils; chemicals such as antiseptics, insecticides, photographic solutions, electroplating solutions, cleaning compounds, solvent purification and lubricating oils; and the like for retention of submicronic particles, removal of bacterial contaminants and resolution of colloidal hazes.

In field testing on wine filtration, filters of this invention have shown flow rates 2 to 3 times comparable asbestos filters, at equivalent clarity and sterility.

The asbestos sheets (41 24 inches sheets, Seitz filter press at 62.5 gpm) evidenced a differential pressure of 25 psi over an 8 hour run of 30000 gallons of dry wine whereas the filter sheets of this invention (75% Code 104 glass, 10% Parez 607 Colloid) with the identical set-up and usage reached a differential pressure of only 9 psi. A reduction in the number of filter sheets of this invention to 19 under the same conditions increased the pressure only to 11 psi, increasing gpm/sq. ft. from 0.38 to 0.82 with obvious economic benefit.

Burgundy contaminated with microaerophilic lactobacilli bacteria to a concentration of 12000 organisms per ml. was filtered through a 75% Code 102 glass, 10% Parez 607 Colloid treated filter sheet, and the colony count per ml of diluted and cultivated substrate measured to be zero, evidencing efficient sterile filtration. Flow rate was excellent at 20 sec/100 ml. A test solution inoculated with yeast cells (saccharomyces cerevisiae) was similarly successfully filtered through identical filter media.

What is claimed is:

1. An improved filter medium of enhanced electrokinetic capture potential for contaminated liquids comprising suspended electronegative particles of about 0.1 to 0.7 micron diameter, said filter medium consisting essentially of
   1. high surface area electronegative microfibers, the electric (zeta) potential of the surface of which is modified with melamine-formaldehyde cationic colloid; and
   2. a matrix of self-bonding fibers.

2. The filter medium of claim 1, wherein said microfibers are comprised of glass fibers of a diameter of from about 0.05 to about 0.75 micron, said self-bonding fibers are comprised of cellulose, and the surface of said glass fibers is electropositive.

3. A process for the filtration of contaminated liquids comprising suspended electronegative particles of about 0.1 to 0.7 micron diameter, said process comprising passing said contaminated liquid through the filter medium of claim 1.

* * * * *